Feb. 17, 1970     C. VAN RINSUM     3,495,685
LUBRICATING SYSTEM FOR CONNECTING ROD AND WRISTPIN
BEARINGS OF INTERNAL COMBUSTION ENGINES
Filed May 1, 1967

INVENTOR
CORNELIS VAN RINSUM
BY
ATTORNEYS

United States Patent Office 3,495,685
Patented Feb. 17, 1970

3,495,685
LUBRICATING SYSTEM FOR CONNECTING ROD AND WRISTPIN BEARINGS OF INTERNAL COMBUSTION ENGINES
Cornelis van Rinsum, Waiblingen, Germany, assignor to Daimler-Benz Aktiengesellschaft, Stuttgart-Unterturkheim, Germany
Filed May 1, 1967, Ser. No. 635,205
Claims priority, application Germany, May 5, 1966,
P 50,042
Int. Cl. F01m 1/00; F16c 1/24, 33/00
U.S. Cl. 184—6
17 Claims

ABSTRACT OF THE DISCLOSURE

A lubricating system for the connecting rod bearing and wristpin bearing of internal combustion engines provided with a valving arrangement for blocking the return flow of the oil from the wristpin bearing during the piston outward movement which is realized by a control groove arranged in the bearing surface of the connecting rod bearing and connected with the oil channel disposed in or at the connecting rod and by such an arrangement of the oil discharge aperture or apertures of the oil line disposed in the crankshaft at the crank pin that the oil discharge apertures are in communication with the control groove only within the area of the acceleration occurring during the inward movements of the piston.

BACKGROUND OF THE INVENTION

Figures 1, 2:
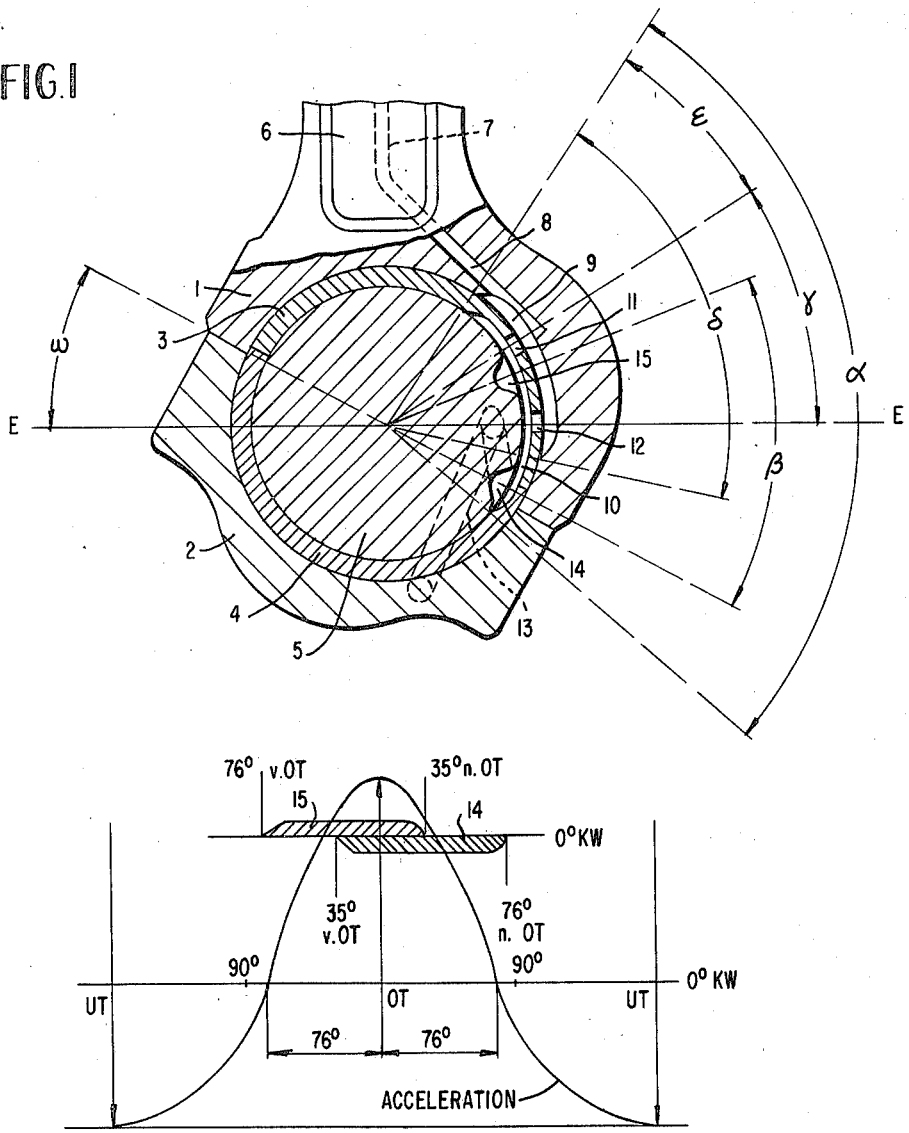

The present invention relates to a lubricating system for the connecting rod and the wristpin bearings of internal combustion engines utilizing an oil channel leading from the connecting rod bearing to the wristpin bearing.

Already known in the prior art are lubricating systems for the crankshaft and connecting rod bearings provided with means for further conducting the lubricant along the connecting rod up to the wristpin bearing, in which a circumferential groove extends in the split bearing bush absorbing the main bearing pressures on the back side thereof and in the split bearing bush, not exposed to the pressures, on the bearing surface thereof and in which the shaft is provided with diametrically opposite radial bores which connect with each other the circumferential groove arranged on the back side of the split bearing bush with the bearing surface as well as the individual bearing places.

Even though an oil quantity sufficient for the lubrication and cooling is supplied by this prior art arrangement to the lubricating places, this prior art arrangement entails the disadvantage of a relatively low pressure because the accelerating forces occurring during the outward movement of the piston seek to centrifuge or throw the oil quantities present in the oil line channel of the connecting rod back again toward the crankshaft. In particular, the pressure does not suffice with the known prior art arrangement to supply with oil of sufficiently high pressure the liquid chambers of two-partite pistons in which the relative movement between the piston parts for purposes of changing the compression space size is effected by the inlet and outlet of liquid in or out of the chambers between the piston parts taking place under the influence of the gas pressure in the cylinder and of the inertia forces.

In order to avoid the aforementioned disadvantage, it has also been proposed already for such types of lubricating systems to provide an oil return blocking means effective during the piston outward movement in the form of a check valve or back-pressure valve at the crank end of the connecting rod oil channel. A disadvantage of such a valve resides in the fact that it includes a movable part which is subjected to the constantly varying centrifugal and flow forces, whence it is exposed to strong wear and strongly susceptible to troubles.

SUMMARY OF THE INVENTION

The present invention, in contradistinction thereto, offers a particularly favorable solution which avoids the check valve.

The present invention essentially consists in the arrangement of an oil collecting and control groove in the bearing surface, which is disposed in its principal direction essentially parallel to the connecting rod axis and is connected with the oil channel disposed at or in the connecting rod, and in such a one-sided arrangement of the oil discharge aperture or apertures of the oil line arranged in the crankshaft at the crank pin that it is in communication with the control groove only within the area of the acceleration occurring during the piston inward movement. It is possible to obtain a particularly long control groove effective within the sense of the inventive purpose and without dangerously weakened places at the connecting rod bearing if the connecting rod bearing is divided or split obliquely to the force direction and the control groove is provided in the longer section of the small end.

Accordingly, it is an object of the present invention to provide a lubricating system for the connecting rod and wristpin bearings of internal combustion engines which avoids by simple means the aforementioned shortcomings and drawbacks encountered in the prior art constructions.

It is another object of the present invention to provide a lubricating system for the big end and small end bearings of internal combustion engines which assures sufficiently high lubricating pressures to satisfy the operational requirements, especially of engines utilizing two-partite pistons.

A further object of the present invention resides in a lubricating system for the connecting rod and wristpin bearings of internal combustion engines which assures a high pressure lubrication without the use of valves utilizing movable parts.

Still another object of the present invention resides in a lubricating system for the connecting rod and wristpin bearings of internal combustion engines which is simple in construction and minimizes the parts necessary therefor.

Another object of the present invention resides in a lubricating system for the connecting rod and wristpin bearings of internal combustion engines which achieves all of the aforementioned aims and objects without entailing the danger of structural weaknesses, particularly in the connecting rod.

These and further objects, features, and advantages of the present invention will become more obvious from the following description when taken in connection with the accompanying drawing which shows, for purposes of illustration only, one embodiment in accordance with the present invention, and wherein:

FIGURE 1 is a cross-sectional view through the connecting rod bearing at the crankshaft of an internal combustion engine and illustrating the lubricating system in accordance with the present invention; and FIGURE 2 is a diagram illustrating the stroke acceleration thereof.

Referring now to the drawing, and more particularly to FIGURE 1, the big end or connecting rod bearing consists in the illustrated embodiment of a small end or Pitman head 1 cut at an angle and having a cover 2 secured thereon. Two bearing bush halves 3 and 4 are inserted into the aforementioned bearing parts which rest directly on the thrust end 5 of the crankshaft. A pressure oil channel 7 leading to the wristpin bearing extends along the connecting rod 6 and is in communication with an annular groove section 9 by way of a channel section 8 arranged in the longer segment of the Pitman head or small end; the annular groove section 9, as such, is open in the direction toward the bearing bush half 3 disposed in front thereof. The bearing bush half 3 is also provided at its bearing surface with a somewhat longer annular groove 10 which is in communication by way of two apertures 11 and 12 with the first-mentioned groove 9. An inclined channel 13 leads from the main bearing of the crankshaft in a conventional manner to the illustrated connecting rod bearing and branches off thereat into two fork-arms 14 and 15 whose discharge apertures or orifices are disposed on the same side of the crank pin cross section 5 and at such a distance from each other within a cross plane determined by the aforementioned grooves 9 and 10 that the two discharge apertures or orifices 14 and 15 with a predetermined position of angular rotation of the crank pin 5 are disposed, respectively, within the area of the groove 10 in the bearing bush half 3.

Decisive for the aimed-at effect of the present invention is the magnitude of the angle α (FIG. 1) over which extends the groove 10, and the angle β, by the amount of which are displaced the orifices 14 and 15 of the lubricating channels—and the fact that the groove 10 and the orifices 14 and 15 are so arranged one-sided at the thrust end 5 of the crankshaft that an oil passage from the channel 13 by way of the channel apertures or orifices 14 and 15, groove 10, apertures 11 and 12, and groove 9 toward the channels 8 and 7 is possible only if the piston together with the connecting rod 1, 2, 6 moves inwardly during its accelerating phase as is precisely illustrated in FIGURE 1.

According to the acceleration diagram of FIGURE 2, for example, an accelerating phase between 76° crankshaft angle (KW) ahead of the top dead center position (v. OT) up to 76° crankshaft angle (KW) after the top dead center position (n. OT) has been selected. The sections of the diagram indicated in cross-hatching represent the respective opening cross section of the channel discharge apertures 14 and 15 during the opening or release thereof by the groove 10. The exploitation or utilization of the phase requires a groove angle α of about 90° (FIG. 2) and a displacement angle β of 55° for the channel discharge apertures 14 and 15 at the crankshaft. The displacement angle γ of the overflow apertures 11 and 12 as well as the extent angle δ of the groove 9 are less decisive. One aims at making the extent angle δ as large as possible. With the illustrated embodiment, a displacement angle γ of about 30° was chosen for the apertures or bores 11 and 12 and these bores otherwise were not symmetrically arranged within the area of the angle ε but displaced or offset by an angle δ of about 30° opposite the direction of rotation of the crank pin 5, i.e., clockwise with respect to FIGURE 1.

The angular values of 76° indicated above for the acceleration are generally standard values valid for the types of engine constructions most frequently used. However, angular deviations of the control periods of ±5° are not of great, significant influence and control periods already changed by 10° only indicate insignificant changes. The accelerating angle is given by the connecting rod ratio $=r/1$ (where $s/2=r$ crank radius, and 1=connecting rod length).

It can be readily seen from FIGURE 2 that as a result of the rapid upward movement of the connecting rod bearing, the oil is also centrifuged or thrown in the upward direction with a large force out of the groove 10 by way of the bores 11 and 12, the groove 9, the connecting channel 8 and the connecting rod channel 7 but is prevented during the outwardly or downward movement of the connecting rod 6 from a return flow because, in the meantime, the channel discharge apertures 14 and 15 have already left for sometime the area of the groove 10, i.e., are now separated by the walls of the bearing bushes 3 and 4 from the groove 10 which, in its turn, is closed by the outer surface of the crank pin 5.

It is thereby of advantage that the control groove 10 is arranged within an angular area of the crank pin which has a relatively slight pressure load. The maximum bearing pressure exists in the direction of the connecting rod at the top by the ignition pressure and at the bottom by the occurring centrifugal force. Within this range the entire connecting rod bearing width is without recesses and also the connecting rod itself has no groove. By the use of a small end 1,2 of the connecting rod bearing having an inclined subdivision offset with respect to a plane E—E perpendicular to the connecting rod axis by an angle ω of about 30° and of a correspondingly subdivided split bearing bush 3,4, dangerous cross-sectional reductions are avoided thereby.

Lubricating and cooling oil in larger quantities and under higher pressure are supplied to the piston wristpin by the present invention. In case of use of the aforementioned Bicera pistons, the oil flowing through the channel 7 is conducted in a conventional manner through the wristpin bearing and/or past the same into the fluid chambers of the piston.

The oil channel 7 leading from the connecting rod bearing to the wristpin bearing may, instead of being cast into the connecting rod, also consist of a pipe line or conduit extending externally along the same.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A lubricating system for the connecting rod and wristpin bearings of internal combustion engines, comprising connecting rod means, oil channel means for operatively connecting these bearings, crankshaft means including crank pin means, connecting rod main bearing means between the connecting rod means and the crank pin means, and oil return blocking means operable during the piston outward movement and located near the crank end of the connecting rod oil channel means, said oil blocking means including oil collecting and control groove means provided in the bearing surface of the connecting rod main bearing means and extending in its principal direction substantially parallel to the connecting rod axis, oil line means arranged in the crankshaft means and provided with one-sided oil discharge aperture means at the crank pin means in such a manner that said discharge aperture means are in communication with the control groove means only within the area of the acceleration occurring during the piston inward movement.

2. A system according to claim 1, wherein said connecting rod main bearing means is subdivided at an inclination to the force direction, and the control groove means is arranged in the longer section of the small head of the connecting rod main bearing means.

3. A system according to claim 2, wherein the connecting rod main bearing means is subdivided at an angle of about 30°.

4. A system according to claim 3, wherein said connecting rod main bearing means includes split bearing bush means having a separating joint plane disposed obliquely to the force direction, the control groove means being provided at least to the largest extent thereof within the inner bearing surface of a bearing bush half and being operatively connected with a further groove means provided in the small end of the connecting rod main bearing means by way of bearing bush bore means disposed within the area of the control groove means.

5. A system according to claim 4, wherein the separating joint plane of the two-partite bearing bush means is arranged obliquely and correspondingly to the subdivision of the small end of the connecting rod bearing means, said further groove means being operatively connected with the connecting rod oil channel means.

6. A system according to claim 5, wherein the oil line means in the crankshaft means branches out into two fork-like sections within the area of the connecting rod main bearing means, the discharge aperture means of the fork-like sections of said oil line means being displaced with respect to each other within the plane determined by the control groove means by a smaller angle than the angle determined by the length of the control groove means.

7. A system according to claim 6, wherein said control groove means and oil discharge aperture means at the crank pin means are so arranged and dimensioned that for the supply of oil to the connecting rod oil channel means an accelerating range of approximately 76° crankshaft angle ahead of the inner top dead-center position to approximately 76° of crankshaft angle after the inner dead-center position is utilized.

8. A system according to claim 7, wherein the engine includes two-partite piston means having oil chamber means, the connecting rod oil channel means being operatively connected by way of a wrist pin bearing means with the oil chamber means, the relative movements of the piston parts for changing the compression space ratio being effected by the inlet and outlet of liquid in and out of the chamber means between the piston parts which takes place under the effect of the gas pressure in the engine cylinder means and of the inertia forces.

9. A system according to claim 1, wherein said connecting rod main bearing means includes split bearing bush means having a separating joint plane disposed obliquely to the force direction, the control groove means being provided at least to the largest extent thereof within the inner bearing surface of a bearing bush half and being operatively connected with a further groove means provided in the small end of the connecting rod main bearing means by way of bearing bush bore means disposed within the area of the control groove means.

10. A system according to claim 9, wherein the separating joint plane of the two-partite bearing bush means is arranged obliquely and correspondingly to the subdivision of the small end of the connecting rod bearing means, said further groove means being operatively connected with the connecting rod oil channel means.

11. A system according to claim 1, wherein the oil line means in the crankshaft means branches out into two fork-like sections within the area of the connecting rod main bearing means, the discharge aperture means of the fork-like sections of said oil line means being displaced with respect to each other within the plane determined by the control grove means by a smaller angle than the angle determined by the length of the control groove means.

12. A system according to claim 11, wherein said control groove means and oil discharge aperture means at the crank pin means are so arranged and dimensioned that for the supply of oil to the connecting rod oil channel means an accelerating range of approximately 76° crankshaft angle ahead of the inner top dead-center position to approximately 76° of crankshaft angle after the inner dead-center position is utilized.

13. A system according to claim 12, wherein the engine includes two-partite piston means having oil chamber means, the connecting rod oil channel means being operatively connected by way of a wristpin bearing means with the oil chamber means, the relative movements of the piston parts for changing the compression space ratio being effected by the inlet and outlet of liquid in and out of the chamber means between the piston parts which takes place under the effect of the gas pressure in the engine cylinder means and of the inertia forces.

14. A system according to claim 1, wherein said control groove means and oil discharge aperture means at the crank pin means are so arranged and dimensioned that for the supply of oil to the connecting rod oil channel means an accelerating range of approximately 76° crankshaft angle ahead of the inner top dead-center position to approximately 76° of crankshaft angle after the inner dead-center position is utilized.

15. A system according to claim 1, wherein the engine includes two-partite piston means having oil chamber means, the connecting rod oil channel means being operatively connected by way of a wristpin bearing means with the oil chamber means, the relative movements of the piston parts for changing the compression space ratio being effected by the inlet and outlet of liquid in and out of the chamber means between the piston parts which takes place under the effect of the gas pressure in the engine cylinder means and of the inertia forces.

16. A system according to claim 15, wherein said connecting rod main bearing means is subdivided at an inclination to the force direction, and the control groove means is arranged in the longer section of the small head of the connecting rod main bearing means.

17. A system according to claim 16, wherein said connecting rod main bearing means includes split bearing bush means having a separating joint plane disposed obliquely to the force direction, the control groove means being provided at least to the largest extent thereof within the inner bearing surface of a bearing bush half and being operatively connected with a further groove means provided in the small end of the connecting rod main bearing means by way of bearing bush bore means disposed within the area of the control groove means.

References Cited

UNITED STATES PATENTS 2,661,253 12/1953 Barlow et al. _____ 308—78
3,069,926 12/1962 Hoffman et al.

FOREIGN PATENTS 1,233,675 2/1967 Germany.

HOUSTON S. BELL, Jr., Primary Examiner

U.S. Cl. X.R.

308—78, 240